United States Patent
Krizenecky

(10) Patent No.: US 8,893,275 B2
(45) Date of Patent: Nov. 18, 2014

(54) JCVM BYTECODE EXECUTION PROTECTION AGAINST FAULT ATTACKS

(75) Inventor: Milan Krizenecky, Meudon (FR)

(73) Assignee: Gemalto SA, Meudon (FR)

(*) Notice: Subject to any disclaimer, the term of this patent is extended or adjusted under 35 U.S.C. 154(b) by 14 days.

(21) Appl. No.: 13/519,933

(22) PCT Filed: Dec. 28, 2010

(86) PCT No.: PCT/EP2010/070801
§ 371 (c)(1),
(2), (4) Date: Jun. 29, 2012

(87) PCT Pub. No.: WO2011/080272
PCT Pub. Date: Jul. 7, 2011

(65) Prior Publication Data
US 2013/0014256 A1    Jan. 10, 2013

(30) Foreign Application Priority Data

Dec. 30, 2009    (EP) .................................... 09306346

(51) Int. Cl.
*G06F 12/14*    (2006.01)
*G06F 21/54*    (2013.01)

(52) U.S. Cl.
CPC ...................................... *G06F 21/54* (2013.01)
USPC .......................................................... 726/23

(58) Field of Classification Search
None
See application file for complete search history.

(56) References Cited

U.S. PATENT DOCUMENTS

| | | | |
|---|---|---|---|
| 7,228,463 B2 | 6/2007 | Giraud | |
| 2003/0018909 A1* | 1/2003 | Cuomo et al. | 713/200 |
| 2004/0078552 A1* | 4/2004 | Chauvel et al. | 712/209 |
| 2004/0078589 A1 | 4/2004 | Giraud | |
| 2006/0242700 A1 | 10/2006 | Fischer | |
| 2008/0040812 A1* | 2/2008 | Giraud et al. | 726/27 |
| 2008/0098265 A1* | 4/2008 | Dmitrovich et al. | 714/710 |
| 2009/0119646 A1 | 5/2009 | Benoit | |

OTHER PUBLICATIONS

PCT/EP2010/070801 International Search Report, Apr. 1, 2011, European Patent Office, P.B. 5818 Patentlaan 2 NL-2280 Rijswijk.
PCT/EP2010/070801 Written Opinion of theInternational Searching Authority, Apr. 1, 2011, European Patent Office, P.B. 5818 Patentlaan 2 NL-2280 Rijswijk.

* cited by examiner

*Primary Examiner* — Brandon Hoffman

(57) ABSTRACT

The invention relates to a computing device comprising means to store and execute bytecodes, the computing device storing bytecodes which comprise a bytecode for calling a method. An attack detection bytecode is present after the bytecode for calling the method, and when executing bytecode, the computing device is set, upon return from the method, to continue bytecode execution after the attack detection bytecode. The invention also relates to a procedure for generating secure bytecode and to an applet development tool.

15 Claims, 2 Drawing Sheets

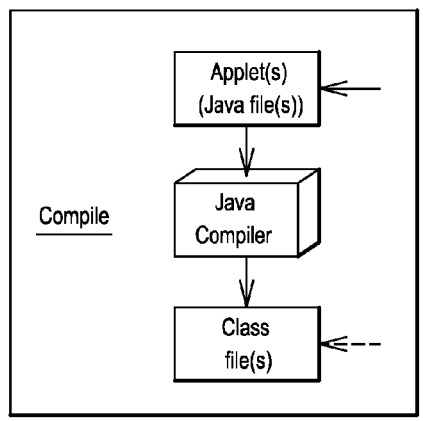
Fig. 2
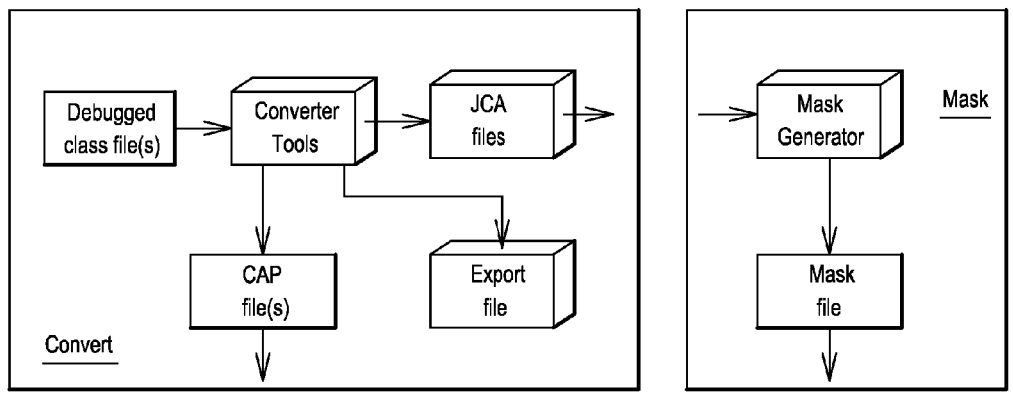
Fig. 3
Fig. 4
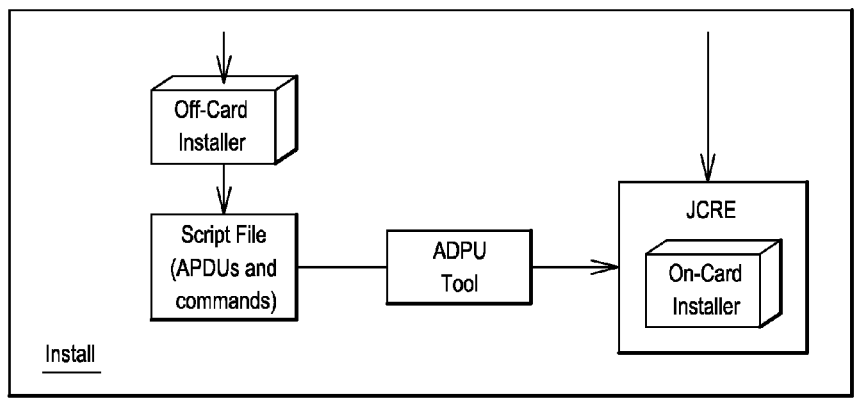
Fig. 5

JCVM BYTECODE EXECUTION PROTECTION AGAINST FAULT ATTACKS

BACKGROUND

1. Field of the Invention

The invention relates to securing applets loaded into computing devices, especially security tokens, against fault attacks.

2. Description of the Related Art

Fault attacks comprise provoking a physical perturbation in a computing device. Attackers typically wish to create a perturbation in a very accurately defined zone of a component of the computing device (e.g. a part of an EEPROM memory chip storing certain interesting data), at a very accurately defined time (in order to know what the computing device is doing when it is attacked and e.g. to be able to target a specific function). Many different techniques exist to create such perturbations. For example it is possible to:

- alter the power supply (e.g. change the Vcc tension from the expected value, for example 5 volts, to a wrong value, e.g. a much higher value such as 50 Volts, possibly during a very short time, in order to create a glitch),
- modify the clock (e.g. overclocking, i.e. increase substantially the clock frequency at a time when an attacker wishes to create a fault),
- modify the temperature (e.g. heat the chip or parts of the chip of the computing device, from ambient temperature to for example 100° C.),
- subject a chip of the computing device to a laser beam, or to radiations such as X-Ray radiation, UV radiation, light radiations, or any form of electromagnetic radiations,
- subject a computing device to vibrations, or
- apply chemical products on parts of a chip.

The aim of faults attacks may be in particular to crack a cryptographic algorithm and recover cryptographic keys, or to circumvent certain protections implemented by the computing device. For example, when a countermeasure is invoked, a fault attack may prevent the countermeasure from working properly.

One type of fault attacks which is particularly efficient is illustrated below, on a very simple applet which java source code is shown on the left side, while the corresponding java bytecodes are shown on the right side.

| Java code: | Bytecode: |
|---|---|
| bParameter =(short) 1; | sconst_1; |
|  | sstore_2; |
| checkSecurity(bParameter); | aload_0; |
|  | sload_2; |
|  | invokespecial 3; |
| if (bParameter == (short) 2) | sload_2; |
|  | sconst_2; |
|  | if_scmpne L5; |
| { |  |
| ... |  |
| } |  |

In this simple applet, if the invokespecial bytecode is skipped during code interpretation (e.g. by transforming the invokespecial bytecode into an innocuous bytecode thanks to a fault attack), the method checkSecurity is not called, while the rest of the applet is executed normally.

A security token is typically an electronic device, which is light and small in order to be easily carried by a user (fits easily in a pocket). It is most often personal. In general, a security token is a resource constrained device, in that at least one of the following is true: its processor is not very powerful, it has little memory, it does not have a source of power (battery etc.) nor a user interface, i.e. in order to interact with the security token a user typically needs to connect the security token (either in contact or in contact-less mode) with a terminal, which provides some power as well as means to input data into the security token and/or to display or otherwise communicate to the user (e.g. with a sound card, an LED, a buzzer, a vibrator, etc.) certain information sent by the security token. More elaborate security tokens may embed a battery, and/or have input/output capabilities such as a small pinpad, or a small LCD.

The most widespread example of security token is probably the smart card. Billions of smart cards are used in the world, and allow card holders (people carrying the smart card) to authenticate themselves e.g. to a financial institution (e.g. when making payment with a bank card), to a telecom operator (e.g. when passing phone calls with a GSM phone equipped with a SIM card), or to a government organization (e.g. when authenticating with a healthcare smart card, ID smart card, or electronic passport). Many other types of security tokens exist, for example USB keys, parallel port dongles, OTP tokens (OTP stands for One Time Password), TPMs (trusted platform modules, specified by the Trusted Computing Group, and which typically allow to secure a computing device by verifying in particular that the hardware components are not modified, and that any software it runs has the good version and has been properly signed), etc.

During the last decade, the number of security tokens embedding a virtual machine has grown significantly, in particular with the advent of JavaCard, Multos cards, and more recently .NET cards. Such security tokens are advantageous because they can be easily programmed by loading an applet into them (e.g. Java applet, .Net applet, etc.). Due to the fact that security tokens are generally resource constrained, the standards in place (e.g. Java or .NET) had to be adapted (for smart cards, it became JavaCard, and for .NET, a stripped down version of .NET had to be implemented) in order to guarantee that an applet is able to run on the security token. E.G. certain "complex" operations (such as floating point operations) are sometimes not supported.

The JavaCard platform is defined primarily by the following three specifications:

- Virtual Machine Specification for the JavaCard™ Platform
- Application Programming Interface for the JavaCard™ Platform
- Runtime Environment (JCRE) Specification for the JavaCard™ Platform The most widespread version of JavaCard is presumably version 2.1, but version 2.2.1 will probably soon become the most widespread. Version 2.2.2 is expected to be the dominant version in the mean term. Version 3 has been released recently but has not yet been widely deployed, it will probably happen a bit later.

A quick overview of the most relevant parts of those specifications is given below.

The JavaCard applet build chain is shown on FIG. 1, it shows the five major steps taking place when building an applet. Each relevant step is described below more in details.

Step 1: Compiling a JavaCard Applet (shown on FIG. 2)

JavaCard applets are written in the Java programming language, using the JavaCard API subset. A standard java compiler is used to generate class files from java files (which are typically text files, written either with a regular text editor, or with a more user friendly environment which can for example automatically highlight certain keywords in certain colors, etc.).

Step 2: Convert the Applet (shown on FIG. 3)

The converter is a tool provided by Sun Microsystems to generate JavaCard conform executable files.

Converter input files are:

one or more class files, which together build a javacard package one or more export files, if the package has external dependencies to other javacard packages Converter output files are:

the package's export file (if the package exports methods, interfaces, classes)

the package's CAP file, which can be loaded on card (in Non Volatile Memory). It is a binary file in compressed format and/or a JCA file (JavaCard Assembly) file: it is the text representation of a CAP file. Therefore, this file is normally not downloaded on card. It is typically used if the package is to be masked (e.g. in ROM or Flash) with the SmartCard Operating system (see next step).

Step 3': "Romize" the package (shown on FIG. 4)

This step is only carried out if it is desired to store the applet in the memory of the card (typically in ROM), in general at chip manufacturing stage. This step is typically performed by a platform specific tool (often called "romizer"), which typically takes all JCA files to "romize" as an input, and links them together in order to generate either an HEX-file that is included in the mask or intermediate files that can be compiled with the Smart Card operating system to generate the complete hardmask with romized packages (also called system libraries). Romizer tools are in general specific to a smart card platform because the link process is strongly tied to the JCVM implementation. The hardmask is typically supplied to a chip manufacturer which can then produce millions of chips comprising the hardmask in question.

Step 3": Load/install the package on card (shown on FIG. 5)

In this step (which is an alternative to step 3'), the CAP file is not preloaded in the chip, but loaded in the memory of the card (e.g. EEPROM or equivalent memory, e.g. Flash etc.) and therefore the link with the system libraries is performed dynamically by the card, instead of the external romizer tool. Once the CAP is loaded and linked, when executing the program on it, the JCVM behaviour is the same as when executing code in system libraries.

A JavaCard virtual machine instruction consists of an opcode specifying the operation to be performed followed by zero or more operands embodying values to be operated upon. These opcodes are coded on one byte which is the origin of the term bytecode. They are equivalent to a basic assembler instruction for native code. The term "virtual machine" is used because it emulates a processor and its registers with an associated instruction set, composed of all java bytecodes.

The term bytecode is not specific to JavaCard. As explained in particular on Wikipedia, the term bytecode can be used to denote various forms of instruction sets designed for efficient execution by a software interpreter as well as being suitable for further compilation into machine code. Since instructions are processed by software, they may be arbitrarily complex, but are nonetheless often akin to traditional hardware instructions; stack machines are common, for instance. Different parts may often be stored in separate files, similar to object modules, but dynamically loaded during execution. Although the name bytecode stems from instruction sets which have one-byte opcodes followed by optional parameters, bytecodes may have arbitrary formats. Intermediate representations such as bytecode may be output by programming language implementations to ease interpretation, or it may be used to reduce hardware and operating system dependence by allowing the same code to run on different platforms. Bytecode may often be either directly executed on a virtual machine (i.e. interpreter), or it may be further compiled into machine code for better performance.

Unlike human-readable source code, bytecodes are stored in the form of compact numeric codes, constants, references (normally numeric addresses) or other data, which encode the result of parsing and semantic analysis of things like type, scope, and nesting depths of program objects. They therefore allow much better performance than direct interpretation of source code.

A bytecode program is normally executed by parsing the instructions one at a time. This kind of bytecode interpreter is very portable. Some systems, called dynamic translators, or "just-in-time" (JIT) compilers, translate bytecode into machine language as necessary at runtime: this makes the virtual machine unportable, but doesn't lose the portability of the bytecode itself. For example, Java and Smalltalk code is typically stored in bytecoded format, which is typically then JIT compiled to translate the bytecode to machine code before execution. This typically introduces a delay before a program is run, when bytecode is compiled to native machine code, but improves execution speed considerably compared to interpretation—normally by several times.

Because of its performance advantage, today many language implementations execute a program in two phases, first compiling the source code into bytecode, and then passing them to the virtual machine. Therefore, there are virtual machines for Java, Python, PHP, Forth, and Tcl, to name a few. The current reference implementation of Perl and Ruby programming language instead work by walking an abstract syntax tree representation derived from the source code.

Examples of JavaCard bytecodes comprise:

aconst_null (0x01), which pushes the null object reference onto the operand stack goto (0x70), wherein the value just behind the opcode (bytecode operand) is used as a signed 8-bit offset. Execution proceeds at that offset from the address of the opcode of the goto instruction. The target address must be that of an opcode of an instruction within the method that contains this goto instruction.

The JavaCard 2.2.1 specifications define 185 bytecodes. These bytecodes take all values between 0 and 184 (0xB8).

There are two important requirements when writing applets for security tokens.

1. The security level should be high, since a security token is supposed to be secure, and for example sensitive data stored in the security token should not be leaked.

2. The overall performance of the security token should remain acceptable, for example for a smart card, an APDU should be executed quickly enough to ensure an acceptable transaction time.

Unfortunately, the two requirements above are in general conflicting, because most often when you increase security you slow down the execution. Enhancing the security of the applet, especially for protecting against fault attacks, may comprise inserting redundancy checks, or multiplying the execution of a given task in order to check that all executions lead to the same result (almost impossible in case of a fault attack), which typically adds executable code and increases execution time.

Conversely, by "optimizing" the applet in order to speed up the execution, the security is often weakened.

These requirements are also complex due to the fact that applets (e.g. Javacard applets) are written in a language (typically interpreted) which is normally supposed to be platform independent. I.E. an applet written by one party (e.g. a smart card manufacturer) should be working on any platform, and not only on the platform initially used by that party (e.g. it should work on the smart card of any other manufacturer), as long as the two platform support the same virtual machine (e.g. same version of Java Virtual Machine—aka JVM—).

So far, three main approaches have been put in place.

1. In a first approach, the whole virtual machine is secured, so the applets may use standard APIs. The resulting executable code is highly portable, but the performances are usually poor as the whole execution is secured instead of focusing on sensitive operations only.

2. In a second approach, the virtual machine is optimized for speed. The security mechanisms embedded in the virtual machine itself are much less powerful than in the first approach. It is up to the applet to rely on proprietary APIs in order to secure its execution, by smartly introducing security mechanisms in the most sensitive parts of the applet. The proprietary API typically provides services securing the execution. The functions provided by such proprietary API typically include:

Inserting randomized delay during the execution is order to make it more complex to synchronize operations needed to attack the card with the execution of the applet.

Managing secure counters for following up the execution of the code.

Monitoring alerts when attacks are detected.

The use of such proprietary API is typically made at sensitive places of the applet. These proprietary APIs are usually called several times as the applet is running. It is the use of these proprietary APIs that secures the applet. However, such applet is no longer interoperable, as it relies on proprietary APIs which are not necessarily available on any platform. In addition, the security fully relies on the developer of the applet (if the developer does not use the security features, the applet is usually insecure).

Like any other software, smart card ones include branches that are taken depending on tests results during the software execution. In the second approach some of these tests and branches are dedicated to secure the code execution by calling proprietary APIs, and/or to verify security policy enforcement. It is typically a goal of people attacking the smart card to disturb the software execution in order to change the results of some tests, or avoid the execution of some bytecodes. Such attacks can be done in particular by physical means, such as introducing disruption by inserting glitches in the clock, temporarily increasing the power supply, using a laser beam on selected part of the surface of the chip, etc. In the second approach, the applet developers tries to identify sensitive parts of the code, and typically adds some code carrying out verifications in these parts of the code, in order to make the attacker task more complex. But this leads to a bigger executable code size and to inferior performances.

3. In a third approach, described in patent application EP08305900, two sets of functionally equivalent bytecodes are proposed, one set being executed securely while the other set is executed quickly.

According to U.S. patent application Ser. No. 10/451,520 ("Method for making secure execution of a program in a microprocessor-based electronic module"), in order to prevent fault attacks, it is proposed to intermittently (and preferably at random time) trigger an interrupt, wherein the interrupt is empty (immediately or almost immediately followed by a return instruction) and wherein the return is optionally followed by trap instructions for detecting a fault attack. One problem with this technique is that it may monopolize interrupt resources and that it is not really suitable to protect specifically selected functions, as the protection is subject to the occurrence of an interrupt during the selected functions. In other words, either the interrupts according to Ser. No. 10/451,520 are triggered very often (which may pose problems with performance and interrupt management), or it is unknown whether a call to a given function is protected or not (since it is not sure that an interrupt will occur during the call to this function).

SUMMARY OF THE INVENTION

It is an objective of the invention to protect the execution of an applet against fault attacks, and in particular against fault attacks attempting to prevent the execution of a method (e.g. a security check method) by introducing a fault during the call to the method, the applet being executed on a computing device, especially on a security token such as a smart card embedding a virtual machine, while running the applet as fast as possible.

BRIEF DESCRIPTION OF THE DRAWINGS

FIG. 2 illustrates Step 1 of the process of FIG. 1: the JavaApplet Compile step.

FIG. 3 illustrates Step 2 of the process of FIG. 1: the JavaApplet Convert step.

FIG. 4 illustrates Step 3' of the process of FIG. 1: the 'Romize' the package step.

FIG. 5 illustrates Step 3" (an alternative to Step 3') of the process of FIG. 1: the Load/Install the package step

DETAILED DESCRIPTION

Figure 1:
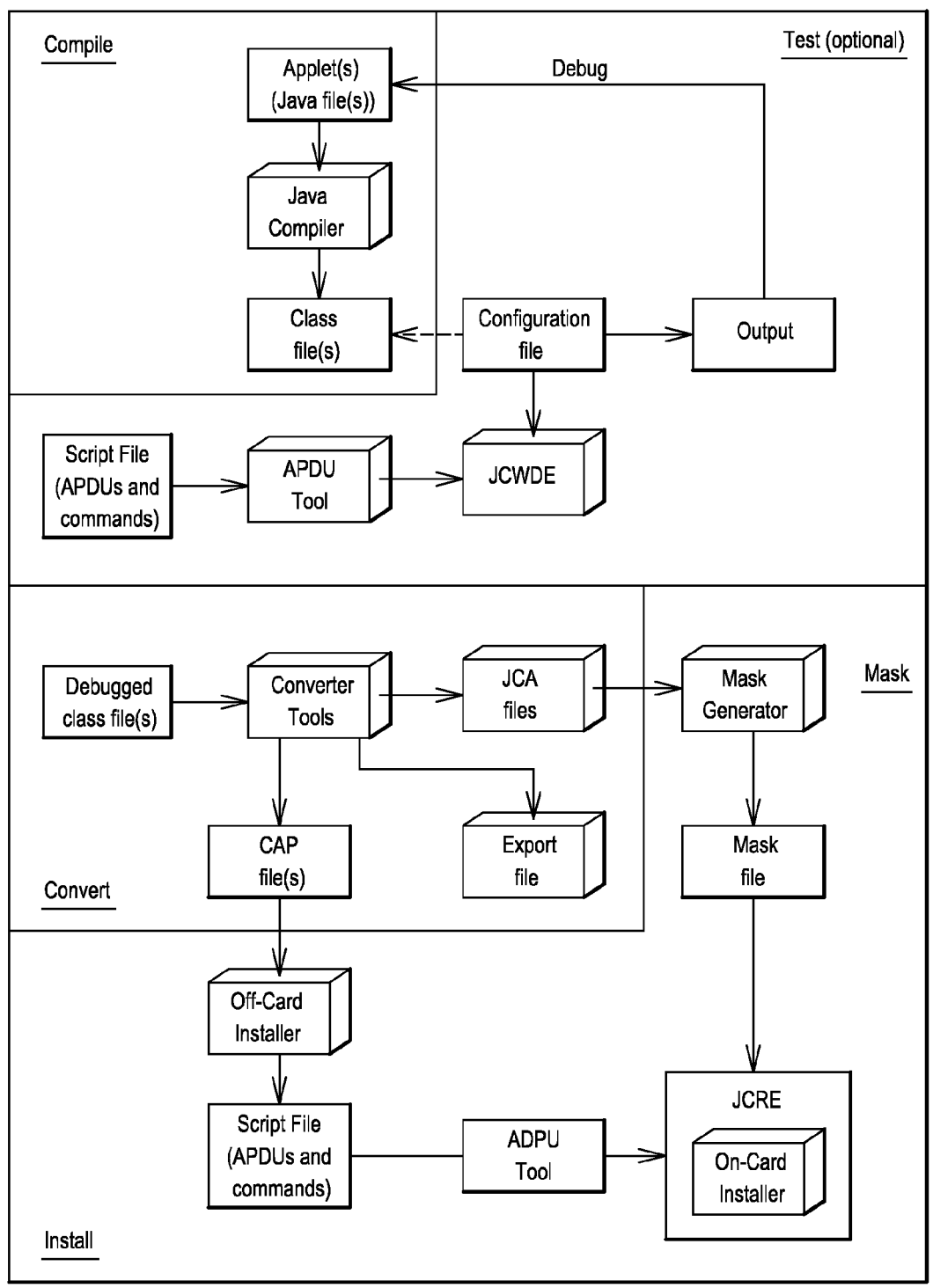
FIG. 1 illustrates the five major steps taking place when building an applet in the JavaCard applet build chain.

The invention relates to a computing device comprising means to store bytecodes (e.g. EEPROM memory, Flash memory, RAM, etc.) and means to execute bytecodes. The means to execute bytecodes typically comprise a virtual machine such as a JVM or another type of virtual machine, such as .NET CLR ("Common Language Runtime") which role is similar to a Java Virtual Machine. The computing device is preferably a security token (in particular a smart card). The computing device stores bytecodes which comprise a bytecode for calling a method. The method can be for example a security verification method. According to the invention, an attack detection bytecode is present after the bytecode for calling the method, and when executing bytecodes, the computing device is set, upon return from the method, to continue bytecode execution after the attack detection bytecode. This protects against fault attacks during the execution of the bytecode for calling the method. An execution of the attack detection bytecode results in the interruption of the applet execution, and optionally in additional countermeasures, for example it may block the computing device which may become unusable, or notify an alert to an external entity (in case the computing device is able to communicate with an external entity), or write that there has been an attack in a log file, or any combination thereof, etc.

This is advantageous because well targeted fault attacks on method calls can be very efficient. Attackers try to identify a sensitive method which they want to skip, for example a method which performs a consistency check, or an authentication, etc. Then they often try to carry out a fault attack when the sensitive method is called. If they are lucky, the damaged bytecode does not crash the computing device, which simply continues executing the bytecodes, without having executed the method. However, since the computing device according to the invention is not supposed, after executing the method, to come back just after the bytecode for calling the method but after the inserted attack detection bytecode, the attack is detected by the execution of the attack detection bytecode which is never supposed to be executed in normal operation (it can only be the result of an attack). This is illustrated on the example below which is an example of applet (already given earlier, but this time secured according to the invention) stored in a computing device according to a preferred embodiment of the invention:

| Java code: | Bytecode: |
|---|---|
| bParameter =(short) 1; | sconst__1; |
| | sstore__2; |
| checkSecurity(bParameter); | aload__0; |
| | sload__2; |
| | invokespecial__bis 3; |
| | trap; |
| if (bParameter == (short) 2) | sload__2; |
| | sconst__2; |
| | if__scmpne L5; |
| { | |
| ... | |
| } | |

In this simple applet, an invokespecial_bis bytecode is set to call a method. If this invokespecial_bis bytecode is skipped during code interpretation (e.g. by transforming the invokespecial_bis bytecode into an innocuous bytecode thanks to a fault attack), the method checkSecurity is not called, but the next bytecode to be executed is a trap bytecode which detects the attack, and prevents the execution of the rest of the applet. In the above example, the invokespecial_bis bytecode does the same as the invokespecial bytecode except that it modifies the return address by incrementing it so that that when the return instruction of the method is reached, execution is resumed after the trap instruction. So invokespecial_bis may work as follows:

invokespecial_bis <method-spec> wherein <method-spec> is a method specification, as in invokespecial.
It is a single token made up of three parts: a classname, a methodname and a descriptor. For example java/lang/StringBuffer/<init>( )V is the method called "<init>" (the special name used for instance initialization methods) in the class called "java.lang.StringBuffer", and it has the descriptor "( )V" (i.e. it takes no arguments and gives no results). But after returning from the method, execution may be resumed for example three bytes after the normal return address which would be used in invokespecial (assuming that the trap bytecode takes three bytes).

According to a preferred embodiment, a randomly selected number of attack detection bytecodes is present after the bytecode for calling the method. Indeed, if the attacker finds out that an attack detection bytecode is systematically present after each bytecode for calling a method, the attacker can decide to use the fault attack not only on the bytecode for calling a method, but also on the next bytecode. In addition, since it is hard for the attacker to be very accurate when carrying out a fault attack (it's hard to know exactly what is happening in the computing device at a given point in time), fault attacks may damage the bytecode calling the method, but sometimes also the previous and/or following bytecodes, which could affect the attack detection bytecode. Thanks to the insertion of a random number of attack detection bytecodes, preferably greater than one, the attacker cannot know whether he is still attacking the method call and the attack detection or whether he is already damaging the "normal" bytecodes which he wishes to be executed. One way to re-compute the return address of the method may be to replace the bytecode for calling a method by a modified bytecode taking as additional input parameter the offset to be added to the normal return address (due to the presence of a number of attack detection bytecodes which have to be skipped). The offset may be an operand explicitly specified within the bytecode (at compilation time) as opposed to operands implicitly specified (e.g. operands to be read from the stack at runtime).

According to a preferred embodiment, the bytecodes can be either javacard bytecodes or .NET card bytecodes or Multos bytecodes.

According to a preferred embodiment, an execution of an attack detection bytecode triggers an exception notifying the computing device of a fault attack. However, there are other possibilities to notify the computing device of an attack, such as a call to a dedicated API (which is typically less advantageous, because typically proprietary and therefore less portable).

In a computing device according to a preferred embodiment, among the bytecodes for calling methods stored in the computing device, only the ones belonging to a subset considered as sensitive are followed by an attack detection bytecode. The computing device does not need to know or understand the criteria used to define a bytecode as sensitive, this can be done by the tools which generate the bytecode loaded into the computing device. The computing device can merely execute what it is asked to execute and therefore protect a given subset of bytecodes, and not the other bytecodes. Defining a subset of sensitive bytecodes is advantageous as it avoids wasting memory for storing attack detection bytecodes after method calls which are not going to be attacked, or at least which attack would not lead to a security issue in the computing device.

The invention also relates to a procedure for generating a file comprising bytecodes, the file being executable by a computing device (in particular a security token, such as a smart card). The procedure is set to identify that a bytecode for calling a method is to be generated. The procedure may work on the basis of a source code, and identify a method call (for example checkSecurity (bParameter)) in the source code. The procedure may also work on the basis of already generated bytecode, and identify a bytecode for calling a method. The bytecodes can be for example javacard bytecodes, .NET bytecodes, or Multos bytecodes. In particular, when the computing device is a smart card embedding a JCVM (javacard virtual machine), there are only four standard bytecodes which can call a method, namely: INVOKE_VIRTUAL, INVOKE_STATIC, INVOKE_SPECIAL, and INVOKE_INTERFACE. The procedure is then set to insert an attack detection bytecode after the bytecode for calling the method, and to modify the computation of the return address of the method so that when the computing system executes the file, upon return from the method, execution continues after the attack detection bytecode, thereby protecting the computing device against fault attacks during the execution of the bytecode for calling methods. Modifying the return address typically has to be done at runtime (although in some environment the addressing space may be predefined and the return address may be a constant, easily replaceable). In order to modify a return address at runtime, one possibility consists, as seen earlier, in replacing the bytecode for calling a method by a modified bytecode which takes one more parameter (the statistically computed offset to be added to the return address). The modified bytecode needs to be supported by the virtual machine which may involve low level modifications in the computing device.

According to a preferred embodiment, the procedure is set to seek, among the bytecodes for calling a method, any bytecodes tagged as sensitive, to insert one or more attack detection bytecodes only after said bytecodes tagged as sensitive, and accordingly to modify the computation of the return address of the method only for said bytecodes tagged as sensitive. In this embodiment, instead of protecting all bytecodes calling a method, only those which are considered sensitive a protected. Methods may be tagged as sensitive by formatting their method name differently so that the procedure can identify methods to be secured from their name (they could also be identified otherwise, but using the name is very efficient). For example, the formatting may consist in adding a prefix to the name of the method to be secured. This allows a quick identification of which methods in the applet should be protected with the technique of the invention. An example of method tagging may comprise prefixing the method name with "SENSITIVE_", as shown below:

```
void SENSITIVE__CheckPin( )
{
    // a call to this method will be secured
    // because the method name a "SENSITIVE_" prefix
}
void method1( )
{
    // this method will be skipped by the procedure
}
```

For example, in the case of javacard, the procedure according to the invention, when operating on the basis of bytecodes produced by a converter, may parse the JCA file, skipping all components until it reaches the method component. Then it can parse all methods. When a method is tagged with a predefined prefix, it can consider it as sensitive and add attack detection bytecodes after any bytecode calling this method.

The procedure according to the invention may be implemented in the form of a standalone tool. This tool can then be used after having compiled the applet which the applet developer wishes to protect. In the case of smart cards, the compilation step (compilation of a java applet or .NET applet for example) is typically followed by a conversion step during which a converter adapts the bytecode to the constrained resources of the smart card. In this case (and whenever a converter is needed), it is preferred for the standalone tool to operate at the level of the "compact" bytecode generated by the converter, i.e. to use the standalone tool after having used the converter (since it avoids any modification on the "standard" bytecode and allows using an off-the-shelf converter). But it is also possible to operate the tool at the level of the "regular" bytecode, and then to adapt the converter in order to be able to properly generate the compacted bytecode. Indeed the offset for the return address in the regular bytecode most often needs to be modified in the compacted bytecode. In addition, if a modified bytecode for calling a method is used for computing the return address, and if this modified bytecode was not supported by the converter (which is likely), support for this bytecode needs to be added in order for this bytecode to be properly dealt with. This last option modifying the converter is most often more complex, unless not only the compacted bytecode but also the "regular" bytecode has a chance to be executed by a virtual machine. But it has the advantage of reducing the number of tools.

Alternatively, the procedure according to the invention may be embedded in a compiler transforming an applet source code into a class file. The compiler is therefore modified in order to generate a modified class file in which at least some of the bytecodes for calling a method are protected. The procedure according to the invention embedded in the compiler may be fully integrated with the compiler, in which case it may operate on the basis of the source file. On the basis of an analysis of the source code, the procedure according to the invention may instruct the compiler to add attack detection bytecode(s) (and take any other measure as described above) whenever it identifies that the source code comprise a method call and (optionally) that the method call is sensitive. In an alternative which requires less modifications to the compiler, the procedure according to the invention is set to generate the file comprising bytecodes from the class file produced by the compiler (in which case it simply identifies the bytecodes for calling a method, and optionally only the sensitive ones). It goes without saying that the compiler may produce one or more class files, and that technologies such as .NET or Multos do not necessarily call the result of the compilation "class file" (different technologies use different terminologies). But the term "class file" is used for the sake of simplicity without intent to reduce the scope of protection to the literal meaning of this term.

Alternatively, the procedure according to the invention may be embedded in a converter transforming a class file produced by a compiler and comprising bytecodes into a file comprising more compact bytecodes adapted for a resource constrained computing device. The procedure according to the invention then preferably operates on the output of the original converter (this allows using an off-the-shelf converter and processing its output with the procedure according to the invention within a single integrated secure converter tool), but it is also possible to operate at class file level, although this implies some complexities as explained earlier in the standalone embodiment.

The invention also relates to an applet development tool comprising tagging means for a developer to tag, in an applet source code, certain applet methods as sensitive, and bytecodes generation means for transforming an applet source code comprising methods tagged as sensitive into a file comprising bytecodes. The means for tagging methods are typically used when writing the applet. For example, the tool may simply provide the ability to type a prefix with the keyboard in front of the name of the method (text editing feature). But in more elaborate versions it is possible to tag a method with a simple click (e.g. right click on the method and selection of the SENSITIVE_tagging, or click on a tagging button, the method being selected before the click, etc.). As seen above, tagging a method name is advantageous because the tagging remains available after compilation. The bytecodes generation means include means to carry out a procedure according to the invention, as described above. The applet development tool may comprise several separate components, such as a source code editor, a standalone compiler, a standalone converter, and a standalone component implementing the procedure according to the invention. Alternatively, certain components may be merged together (for example compiler plus procedure of the invention, or converter plus procedure of the invention, or even the three together). The development tool preferably comprises a graphical user interface allowing the user to use the different tools from a single environment. Command line tools may also be available.

The preferred embodiments described in relation to any one of the following objects:
- the computing device,
- the procedure, and
- the applet development tool, apply equally to the other two objects.

The invention claimed is:

1. A computing device comprising means to store and execute bytecodes, the computing device storing bytecodes having a bytecode for calling a method and wherein the bytecode calling a sensitive method is followed by an attack detection bytecode present after the bytecode for calling the method, and in that when executing bytecode, the computing device, upon return from the method, operates to continue bytecode execution after the attack detection bytecode, and wherein execution of the attack detection bytecode upon return from the method is indicative of an error in execution of the method thereby protecting against fault attacks during the execution of the bytecode for calling the method.

2. The computing device according to claim 1, wherein a randomly selected number of attack detection bytecodes are present after the bytecode for calling the method.

3. The computing device according to claim 1 or 2, wherein the bytecodes are either javacard bytecodes or .NET card bytecodes or Multos bytecodes.

4. The computing device according to claim 1 or 2, wherein an execution of an attack detection bytecode triggers an exception notifying the computing device of a fault attack.

5. A procedure for operating a first computing device generating a file comprising bytecodes, the file being executable by a second computing device, the procedure comprising:
- identifying that a bytecode for calling a method is to be generated,
- determining if the bytecode for calling a method is tagged as sensitive,
- inserting one or more attack detection bytecodes if said bytecode is tagged as sensitive, and
- modifying the computation of the return address of the method if said bytecode is tagged as sensitive,
- so that when the computing system executes the file, upon return from the method, execution continues after the attack detection bytecode, wherein execution of the attack detection bytecode upon return from the method is indicative of an error in execution of the method thereby protecting the computing device against fault attacks during the execution of the bytecode for calling methods.

6. The procedure according to claim 5, wherein the first and second computing devices are not the same computing device.

7. The procedure according to claim 5, further comprises transforming an applet source code into a class file.

8. The procedure according to claim 7, wherein the procedure generating the file comprising bytecodes from the class file.

9. The procedure according to claim 7, wherein the procedure comprises generating the file comprising bytecodes from the applet source.

10. The procedure according to claim 5, further comprises converting a class file produced by a compiler and comprising bytecodes into a file comprising bytecodes adapted for a resource constrained computing device.

11. The procedure according to claim 10, wherein the procedure comprises generating the file comprising bytecodes from the class file.

12. The procedure according to claim 10, wherein the procedure comprises generating the file comprising bytecodes from the file comprising compact bytecodes adapted for a resource constrained computing device.

13. The procedure according to claim 9, wherein the methods are tagged as sensitive by formatting their method name differently so that the procedure can identify methods to be secured from their name.

14. An applet development tool comprising
- means for a developer to tag, in an applet source code, certain applet methods as sensitive, and
- means for transforming an applet source code comprising methods tagged as sensitive into a file comprising bytecodes, the means for transforming an applet source code into a file comprising byte codes including means to carry out a procedure having the steps:
- identifying that a bytecode for calling a method is to be generated,
- inserting an attack detection bytecode after the bytecode for calling the method, and
- modifying the computation of the return address of the method so that when the computing system executes the file, upon return from the method, execution continues after the attack detection bytecode, wherein execution of the attack detection bytecode upon return from the method is indicative of an error in execution of the method thereby protecting the computing device against fault attacks during the execution of the bytecode for calling methods.

15. The applet development tool of claim 14 wherein the means for transforming an applet source code into a file comprising byte codes further includes means to carry out a procedure having the steps:
- seeking, among the bytecodes for calling a method, any bytecodes tagged as sensitive,
- inserting one or more attack detection bytecodes only after said bytecodes tagged as sensitive, and
- modifying the computation of the return address of the method only for said bytecodes tagged as sensitive.

* * * * *